Figure 1:
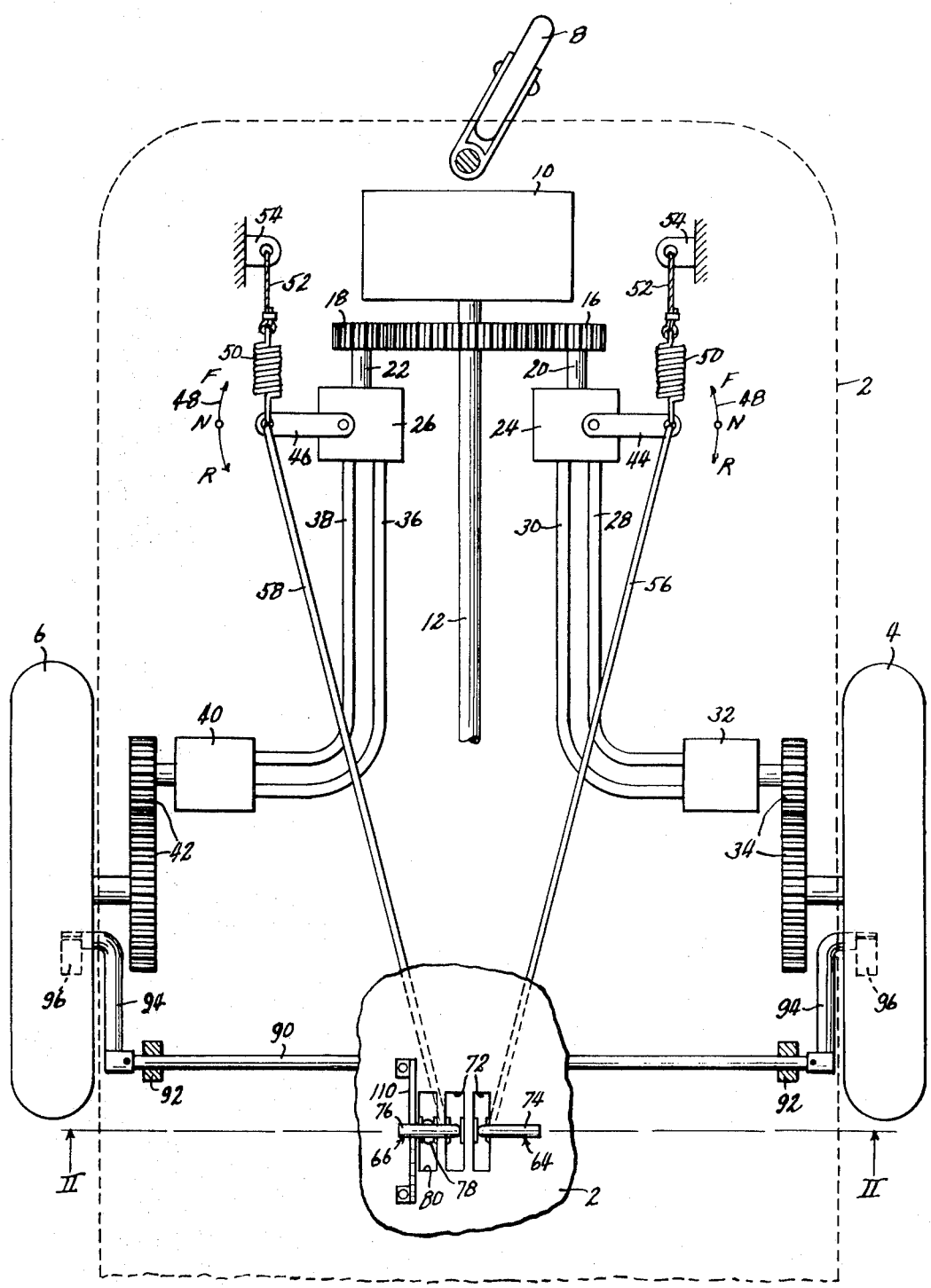

United States Patent

[11] 3,616,869

| [72] | Inventor | Raymond J. Rilling |
| | | Moundridge, Kans. |
| [21] | Appl. No. | 865,729 |
| [22] | Filed | Oct. 13, 1969 |
| [45] | Patented | Nov. 2, 1971 |
| [73] | Assignee | Excel Industries, Inc. |
| | | Hesston, Kans. |

[54] PROPULSION, STEERING, AND BRAKING SYSTEM FOR VEHICLES
1 Claim, 3 Drawing Figs.

[52] U.S. Cl............................................ 180/6.48,
74/480 R
[51] Int. Cl....................................................... B62d 11/04
[50] Field of Search............................................. 180/6.48,
6.5, 6.2, 77 H; 74/480 R, 491

[56] References Cited
UNITED STATES PATENTS

| 2,579,959 | 12/1951 | Petersen........................ | 74/480 R |
| 2,936,840 | 5/1960 | White............................ | 180/6.66 |
| 3,224,196 | 12/1965 | Bennett......................... | 180/6.48 X |
| 3,349,860 | 10/1967 | Ross.............................. | 192/4 B X |
| 3,469,381 | 9/1969 | Burrough et al............... | 180/6.3 |

*Primary Examiner*—Benjamin Hersh
*Assistant Examiner*—John A. Pekar
*Attorney*—John A. Hamilton ABSTRACT: A propulsion, steering, and braking system for a vehicle having a pair of axially aligned ground-engaging wheels, said system including a prime mover, a pair of hydraulic pumps driven by said prime mover and each operable to drive a hydraulic motor to turn one of said wheels, each hydraulic pump having a control lever having a neutral position in which its delivery rate is zero and being movable selectively in opposite directions from said neutral position to cause operation of the associated motor in relatively opposite directions, manual means for moving said control levers, manually operable brake means for both of said wheels, and means operable by application of said brake means to return both of said control levers to their neutral positions.

INVENTOR.
Raymond J. Rilling
BY John A. Hamilton
Attorney.

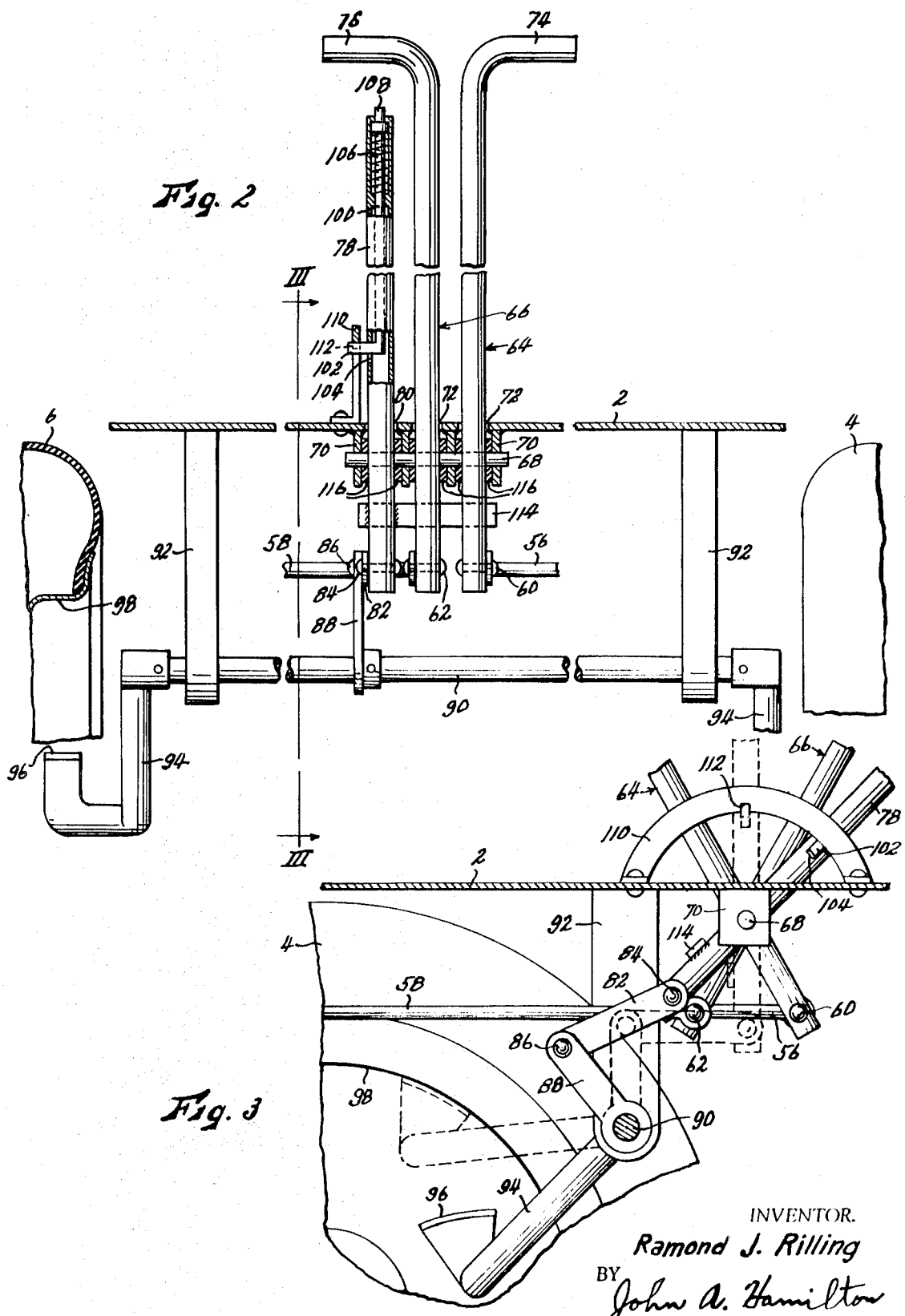

PROPULSION, STEERING, AND BRAKING SYSTEM FOR VEHICLES

This invention relates to new and useful improvements in propulsion, steering, and braking systems for vehicles, and has particular reference to such a system especially designed for use on agricultural or utility vehicles such as mowers, snow plows, and the like, although it will be readily apparent that the system is not limited to use on such vehicles, but has application to vehicles in general.

Among the objects of the present invention are the provision of means, in a vehicle having a pair of ground-engaging wheels capable by rotation of propelling said vehicle, and by rotation at unequal speeds to steer said vehicle, of means powered by a prime mover to drive said wheels, means for varying the speed of said wheels independently of the speed of said prime mover, whereby the prime mover can be utilized, also for powering a mower or other implement carried by the vehicle, means for driving the wheels at unequal speeds to steer the vehicle, or even in opposite directions to provide extremely short-turning manually operable mechanical brakes for both of said wheels, and means operable by application of said brakes to neutralize the driving connection to said wheels.

Other objects are simplicity and economy of construction, efficiency and dependability of operation, and safety and convenience of usage.

With these objects in view, as well as other objects which will appear in the course of the specification, reference will be had to the accompanying drawing, wherein:

FIG. 1 is a fragmentary top plan view, largely schematic in nature, of a vehicle including a propulsion, steering, and braking system embodying the present invention, FIG. 2 is an enlarged, fragmentary sectional view taken on line II—II of FIG. 1, with parts left in elevation and partially broken away, and FIG. 3 is a fragmentary sectional view taken on line III—III of FIG. 2 showing the brakes released in solid lines, and applied in dotted lines.

Like reference numerals apply to similar parts throughout the several views, and the numeral 2 applies to the frame of the vehicle, said frame for convenience being illustrated as a planar, horizontal platform. Said frame is supported adjacent its forward end by left and right ground-engaging wheels 4 and carried rotatably thereby, said wheels being coaxial on a horizontal transverse axis, and at its rearward end by a central castered wheel 8. Thus the vehicle can be driven forwardly or rearwardly by turning wheels 4 and 6 at equal speeds in either direction, and can be steered by turning wheels 4 and 6 at unequal speeds, or in relatively opposite directions.

Mounted in base 2 is a prime mover such as an internal combustion engine 10. The power output shaft 12 of said engine extends forwardly beneath the frame, and may be used to drive a mower, snow plow, or other implement, not shown, carried at the forward end of the frame. Also mounted on shaft 12 is a gear 14, which in turn drives a pair of gears 16 and 18 mounted respectively on the power input shafts 20 and 22 of a pair of hydraulic pumps 24 and 26 also mounted on frame 2. Pump 24 is connected by conduits 28 and 30 to a hydraulic motor 32 mounted on frame 2 and operable through a suitable gear train 34 to turn left wheel 4. Similarly, pump 26 is connected by conduits 36 and 38 to a hydraulic motor 40 mounted on frame 2 and operable through gear train 42 to drive right wheel 6. Pumps 24 and 26 are of constant speed, variable delivery type. That is, for any given speed at which they may be driven by engine 10, their rate of fluid delivery may be varied or reversed, by suitable control means. For this purpose, the pumps are provided with pivotal control levers 44 and 46 respectively. Said levers each have a neutral position as indicated at N on the directional arrows 48 in FIG. 1, at which position the pumps have a zero delivery rate and motors 32 and 40 are hydraulically locked against rotation. When the levers are pivoted rearwardly toward their F positions as indicated by arrows 48, fluid is delivered to the motors through conduits 28 and 36 and returned through conduits 30 and 38 to drive the motors to propel the vehicle forwardly, and when the levers are pivoted forwardly toward their R positions as indicated by arrows 48, fluid is delivered to the motors through conduits 30 and 38 and returned through conduits 28 and 36 to drive the motors to propel the vehicle rearwardly. In either case, the rate of delivery of the pumps, and hence the resultant speed of operation of the motors, is directly proportional to the degree of displacement of the levers from their neutral positions. Variable delivery pumps 24 and 26 are of a commonly known, commercially available type, and therefore are not here detailed as to internal structure. Also, while each pump and its associated motor are here diagrammed as connected in a simple, closed-loop hydraulic system, it will be understood that said system will include such elements as reservoirs, charging pumps and the like, all well known in the art.

Movement of each of control levers 44 and 46 toward its R position is resisted by a tension spring 50 connected to the free end thereof, the opposite end of said spring being connected by a flexible cable 52 to an anchor member 54 which is fixed relative to frame 2. It will be understood that springs 50 are completely closed, or relaxed, when levers 44 and 46 are in their neutral positions, but are resiliently extended when said levers are moved forwardly. The springs do not function to move the levers rearwardly, but cables 52 can go slack so that springs 50 do not impede rearward movement of the levers.

Control levers 44 and 46 are actuated by a pair of connecting rods 56 and 58 respectively, each of said rods being connected at its rearward end to the free end of its associated control lever, and extending forwardly beneath frame platform 2. Said connecting rods are pivoted at their forward ends, at 60 and 62 respectively, to the lower ends of a pair of elongated control handles 64 and 66. Said handles are pivoted, at points above connections 60 and 62, on a horizontal pivot pin 68, extending transversely to the frame and journaled in ears 70 of said frame, and extend upwardly through slots 72 formed in frame platform 2 to points above said platform, being provided at their upper ends with hand grips 74 and 76 for manual movement of said handles. When the handles are pivoted into parallel alignment and are substantially vertical, control levers 44 and 46 are in their neutral positions. This may also be termed the neutral positions of handles 64 and 66.

Also pivoted on pivot pin 68 is a brake lever 78 extending vertically through a slot 80 of platform 2. The lower end of said brake lever has one end of a link 82 pivoted thereto at 84, and the opposite end of said link is pivoted at 86 to the free end of a crank 88 which is fixed to a horizontal shaft 90 which extends horizontally between wheels 4 and 6, and is carried rotatably by bearings 92 affixed to frame 2. Affixed to each end of shaft 90 is a radially extending arm 94 to the outer end of which is fixed a brake shoe 96. Thus, when the upper end of lever 78 is pulled rearwardly, it functions through link 82, crank 88, shaft 90 and arms 94 to move said brake shoes tightly against the inner surfaces of the rims 98 of wheels 4 and 6 respectively, thereby securing said wheels against rotation.

Brake lever 78 is tubular, and in its upper end portion is disposed a push rod 100. At its lower end, but above platform 2, push rod 100 has affixed thereto a tooth 102 projecting laterally outwardly through a longitudinally elongated slot 104 forward in the lever. Said push rod is biased upwardly by a spring 106 carried in the lever, but may be moved downwardly by a pushbutton 108 at the upper end of the lever. As the brake lever is pivoted, tooth 102 moves slidably along the inner edge of an arcuate quadrant 110 affixed to the upper surface of platform 2, concentrically with pivot pin 68. At the position of the brake lever at which brake shoes 96 are fully applied, quadrant 110 has a single notch 112 formed therein, into which tooth 102 is elevated by spring 106 to secure the lever against movement. At this position the brake lever is parallel to handles 64 and 66, when the latter are in their neutral positions. By pressing downwardly on pushbutton 108, tooth 102 is freed from notch 112, and the upper end of the brake lever may be pivoted forwardly to release the brakes. In FIG. 3 the brakes are shown released in solid lines, and applied in dotted lines.

A horizontal crossbar 114 is affixed, as by welding, to the rearward side of brake lever 78, between pivots 68 and 84 thereof, and extends horizontally behind the corresponding lower end portions of handles 64 and 66, as best shown in FIGS. 2 and 3, but is not attached to said handles.

In operation, brake lever 78 is first pivoted forwardly as previously described, and as shown in solid lines in FIG. 3. This release brake shoes 96 from wheel rims 98, freeing wheels 4 and 6 for rotation, and moves crossbar 114 rearwardly out of the normal pivotal range of the lower end portions of handles 64 and 66, so as not to interfere with their movement. Engine 10 may then be in operation driving pumps 24 and 26, but the vehicle will not move since control levers 44 and 46 of the pumps are in their neutral positions so that motors 32 and 40 are inoperative. Then, if it is desired to propel the vehicle forwardly, the driver, who usually occupies a seat on frame 2 to which handles 64 and 66 are conveniently located, presses forwardly on both of handles 64 and 66. This moves connecting rods 56 and 58 rearwardly, pivoting control levers 44 and 46 rearwardly to actuate pumps 24 and 26 to deliver fluid to motors 32 and 40 to drive wheels 4 and 6 in a forward direction. The degree of movement determines the operational speed of the motors, and hence the speed of vehicle travel, independently of the speed of engine 10, which may operate at a constant speed for driving a mower or other powered implement carried by the vehicle. Since commonly the vehicle may travel forwardly in a straight line for considerable distances, it is often desirable that the operator be free to remove his hands from handles 64 and 66 for use in other operations. For this purpose, friction washers 116 are mounted on pivot pin 68 in engagement with each of said handles, and will hold said handles frictionally in any forward position to which they may have been moved. Brake lever 78 may also be provided with friction washers 116, as shown. Conversely, if it is desired to propel the vehicle rearwardly, handles 64 and 66 are pulled rearwardly, causing connecting rods 56 and 58 to pivot control levers 44 and 46 forwardly to cause reverse operation of motors 32 and 40, as previously described. For safety reasons, it is generally desirable that the driver be paying close attention, and have both hands on handles 64 and 66, during reverse travel. It is for this reason that springs 50 are incorporated, since they return the handles automatically to their neutral positions if for any reason the driver removes his hands from the handles during reverse travel. Springs 50 are amply strong to overcome the resistance of friction washers 116.

If the vehicle does not travel in an accurately straight line when handles 64 and 66 have apparently been moved in equal amounts, the course can be corrected by moving the handle at the "inside" of the curve a little farther from neutral to cover the wheel 4 or 6 at that side of the vehicle to turn a little faster. The delicate control provided by this "trim steering" feature is often very important in providing the accurate control of the vehicle course required in many usages of the vehicle, for example in moving an agricultural implement along row crops. On the other hand, intentional turning of the vehicle, in either direction, can be obtained at any time by deliberately moving handles 64 and 66 unequally, so that wheels 4 and 6 turn at substantially different speeds. The sharpness of turn is of course determined by the difference of speed of the two wheels, a greater differential resulting in a shorter turn radius. In fact, by turning wheels 4 and 6 at equal speeds but in opposite directions which is quite simply done with the present system by moving one of handles 64 and 66 forwardly and the other rearwardly, the vehicle can be made to turn in its own radius, about a vertical axis midway between the wheels. To park the vehicle, handles 64 and 66 are simply released, and brake lever 78 is pulled rearwardly until tooth 102 thereof engages in notch 112 of quadrant 110. This applies brake shoes 96 to wheel rims 98, as previously described, and at the same time moves crossbar 114 forwardly. The crossbar moves the lower ends of handles 64 and 66 forwardly to their neutral positions, if said handles were previously set for forward travel. If they were previously set for reverse travel, they will be pulled against the crossbar by springs 50. Thus the handles 64 and 66, and hence also pump control levers 44 and 46, are moved to and accurately held in their neutral positions, eliminating the possibility that the driver might leave the vehicle unattended with the controls accidentally left set in position to cause very slow movement of the vehicle. Also, while as previously mentioned hydraulic motors 32 and 40 are hydraulically locked against rotation when pump control levers 44 and 46 are in their neutral positions, the mechanical brakes exemplified by brake shoes 96 are nevertheless desirable to guard against the possibility that the vehicle, if left parked on sloping terrain, could inch or creep down the slope due to slow but inevitable leakage in the hydraulic systems.

While I have shown and described a specific embodiment of my invention, it will be readily apparent that many minor changes of structure and operation could be made without departing from the spirit of the invention.

What I claim as new and desire to protect by Letters Patent is:

1. In combination with a vehicle having a pair of ground-engaging wheels operable by rotation thereof at equal speeds to propel said vehicle in a straight line and by rotation thereof at unequal speeds to change the direction of travel of said vehicle:
   a. a prime mover carried by said vehicle,
   b. a pair of power trains interconnecting said prime mover with said ground-engaging wheels respectively, c. manually operable control means in each of said power trains whereby the rotation of the associated wheel may be started, stopped, reversed, and varied in speed without affecting the other of said wheels and without changing the speed of operation of said prime mover, said control means including a manually movable control member having a neutral position at which the associated wheel is not driven and being movable in opposite directions from said neutral position to cause said associated wheel to be driven in respectively opposite directions, the speed of operation of said wheel varying with the displacement of said control member from it neutral position,
   d. resilient means biasing the control members of both power trains yieldably toward their neutral positions whenever they are displaced in one direction from their neutral positions,
   e. a single manually movable operating member operable to return said control members of both power trains to their neutral positions whenever they are displaced in the opposite direction from their neutral positions,
   f. mechanical brake means operable when applied to resist rotation of both of said ground-engaging wheels, and
   g. mechanical means operable by movement of said operating member to its neutralizing position to apply said brake means.

* * * * *